UNITED STATES PATENT OFFICE.

RIDSDALE ELLIS, OF OAK PARK, ILLINOIS.

ICE MANUFACTURE.

1,415,325.  Specification of Letters Patent.  Patented May 9, 1922.

No Drawing.  Application filed February 14, 1919. Serial No. 277,095.

*To all whom it may concern:*

Be it known that I, RIDSDALE ELLIS, a citizen of the United States, and a resident of Oak Park, in the county of Cook and State of Illinois, have invented certain new and useful Improvements in Ice Manufacture, of which the following is a specification.

My invention relates to the manufacture of artificial ice and is more particularly applicable to the making of raw water ice as distinguished from distilled water ice.

Water ordinarily contains air in solution and on freezing the water this air is forced out of solution and the resulting air bubbles tend to freeze into the ice making it opaque or what is known in the art as a "tombstone."

Further, if the water contains bicarbonates, such as those of calcium or magnesium, they are decomposed with the formation of carbon dioxide which is then forced out of solution by the freezing operation.

It has been customary to prevent the adherence of the bubbles to the ice by violently agitating the water during freezing by blowing air therethrough. There are many disadvantages connected with the use of air agitation such as the heat which the air introduces, the trouble and labor involved in compressing the air, introducing air pipes into each can and withdrawing the pipes at the right time and so forth.

The principal object of my invention is, therefore, the provision of means for enabling ice to freeze substantially clear without resorting to agitation.

According to the present invention the adhesion of the gas bubbles, whether air, carbon dioxide or other gas, to the ice and their consequent inclusion in the ice is inhibited by the addition of substances which lower the surface tension of water with respect to air to a marked degree.

Many such substances are known, for example, saponin, the salts of some of the complex organic acids, such as sodium oleate, and others, chiefly organic materials.

The reduction of the surface tension at the air-water or other interface is accompanied by the adsorption of the material at that interface. In the case of saponin this adsorption takes place to such an extent that an extremely thin highly viscous and almost solid layer of saponin is formed at the interface. Although the effect is less marked with soap than wtih saponin it is a very characteristic feature.

In the selection of suitable substances of this character for use in ice manufacture several other factors than surface tension enter. Among these may be mentioned cost, freedom from color, which prevents the use of many organic substances related to the dyestuffs, absence of pronounced smell, taste and injurious effects on the body when taken internally even is small doses.

In view of these requirements saponin appears to be as satisfactory as any other readily available substance. It is also convenient to use on account of its ready solubility in water. Further, very minute quantities of this material are effective and any harmful effects on the human system which it may have can be completely eliminated by treating the saponin with hot barium hydroxide as described in Chem. Zentr. 1913, I, 852–3.

Hence in the preferred method of carrying out my invention I add a minute quantity of saponin, not ordinarily in excess of one part in a million, to the water to be frozen. The saponin is conveniently dissolved in water and a fixed amount of the solution added and adequately mixed with the water in any convenient way. Preferably, however, the saponin is added after the water has been softened to prevent loss due to its adsorption on the surface of the precipitated lime and magnesia compounds. In some cases to simplify the method of treatment it may be found convenient to add the saponin with the lime and soda employed for softening the water.

Saponin may be used with distilled water as it avoids the necessity of re-boiling to drive off the air and carbon dioxide absorbed during and subsequently to the condensation of the steam.

I claim:—

1. The process of making artificial ice which includes the addition to the water of readily adsorbed material to inhibit the freezing of air bubbles into the ice and then freezing the water so treated.

2. The process of making artificial ice which includes the addition to the water of saponin to inhibit the freezing of air bubbles into the ice and then freezing the water so treated.

3. The process of making artificial ice which includes the addition to the water of material adapted to form by adsorption a highly viscous layer at an air-water interface and then freezing the water so treated.

4. The process of making artificial ice which includes the addition to the water of material adapted to reduce materially the air-water surface tension to inhibit the freezing of air bubbles into the ice and then freezing the water so treated.

RIDSDALE ELLIS.